INVENTOR
Edward A. Stalker

June 5, 1945.    E. A. STALKER    2,377,457
AIRCRAFT
Filed July 5, 1941    4 Sheets-Sheet 2
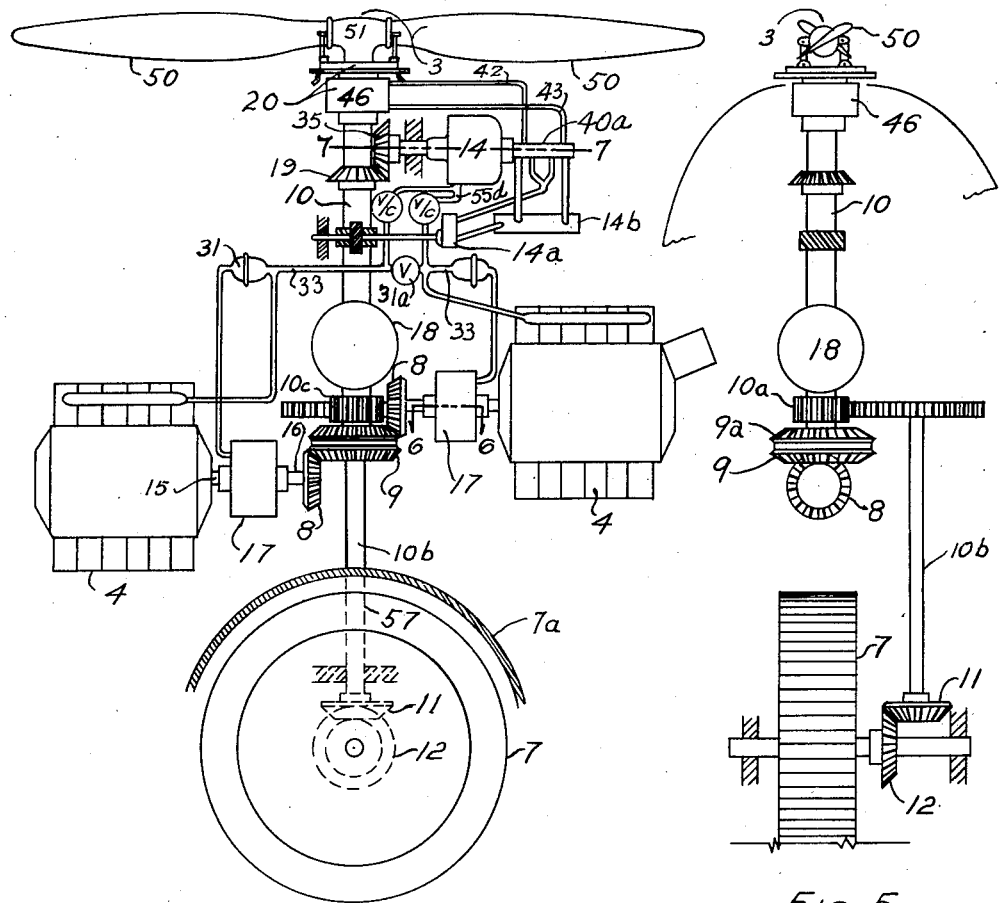
FIG. 4
FIG. 5
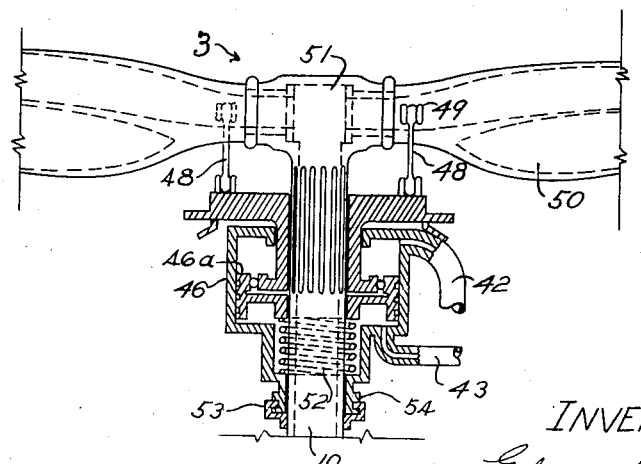
FIG. 9
INVENTOR
Edward A. Stalker June 5, 1945. E. A. STALKER 2,377,457
AIRCRAFT
Filed July 5, 1941 4 Sheets-Sheet 3
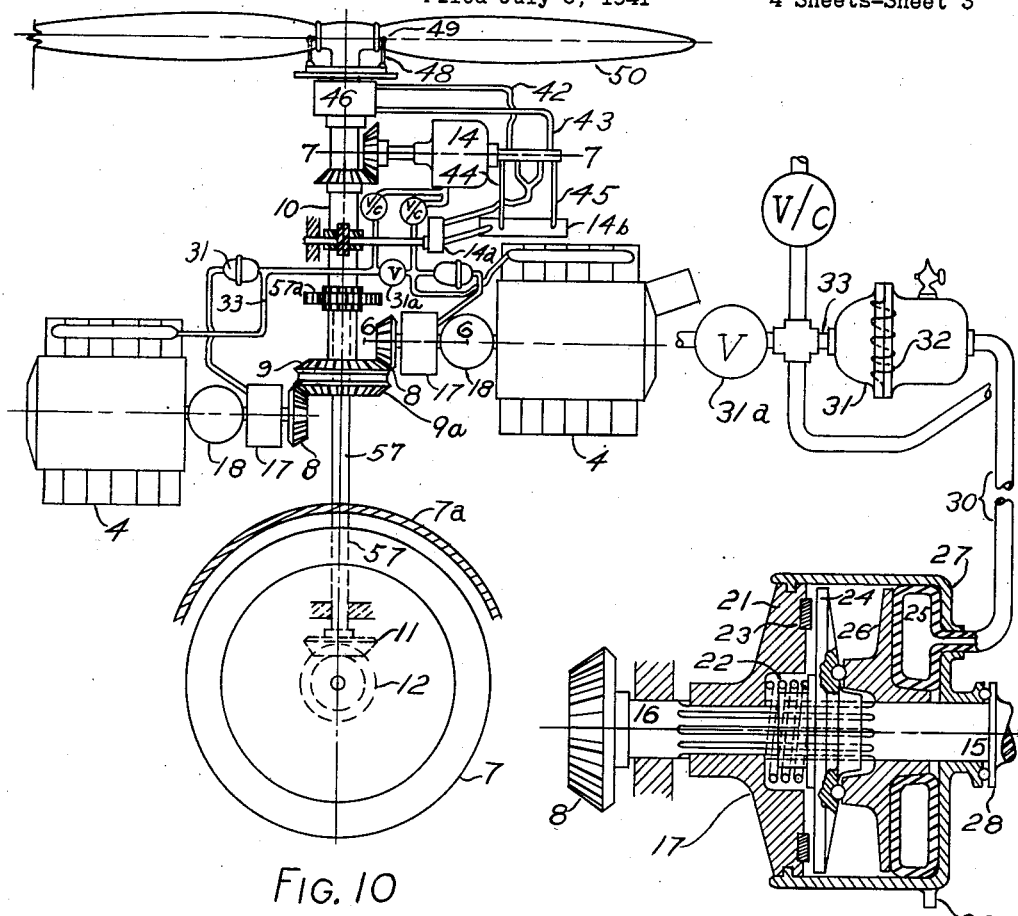
FIG. 10
FIG. 6
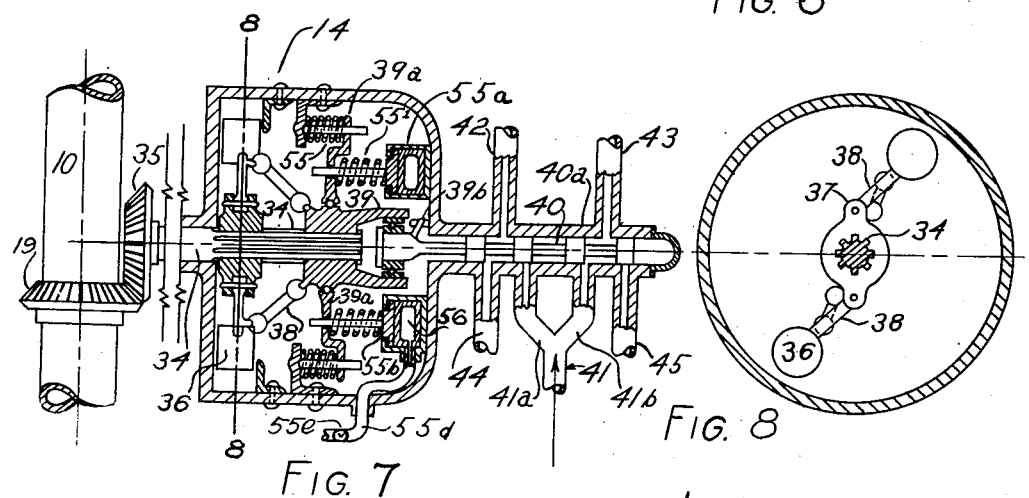
FIG. 7
FIG. 8
INVENTOR
Edward A Stalker

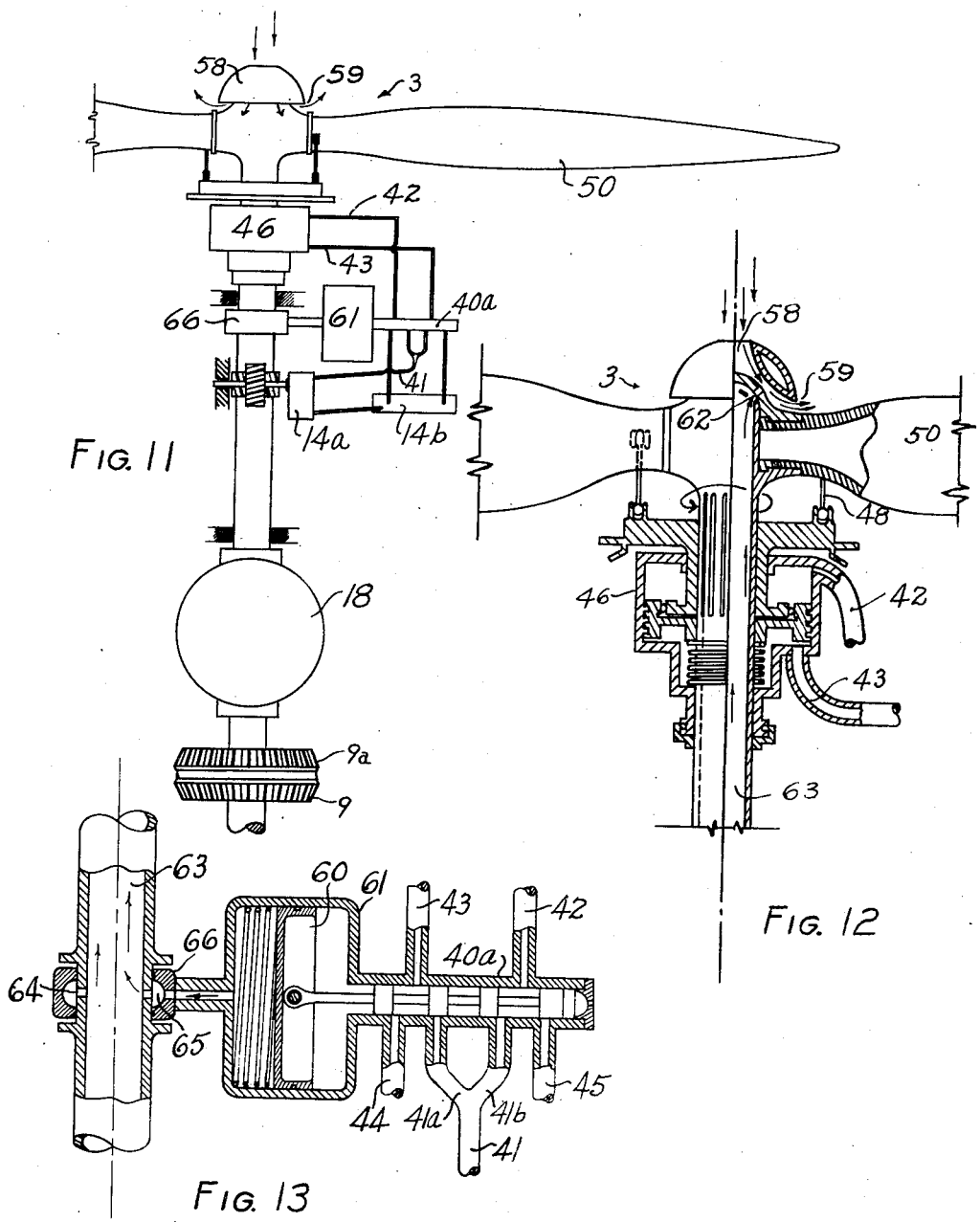

Patented June 5, 1945

2,377,457

UNITED STATES PATENT OFFICE 2,377,457

AIRCRAFT

Edward A. Stalker, Ann Arbor, Mich., assignor to
The Dow Chemical Company, Midland, Mich.,
a corporation of Michigan Application July 5, 1941, Serial No. 401,171

13 Claims. (Cl. 170—135.6)

My invention relates to aircraft and more particularly to the power plant. It has for its objects first to provide a means of connecting the propeller and engine efficiently; second to provide clutch means which enables the propeller to act as a fly wheel to drive the engine; third to provide a means of governing the rate of rotation of the propeller when it is connected to the engine by a torque converter or an automatic clutch. Other objects will appear from the description and drawings.

Some of the material in this application was part of my application Serial No. 312,173 in which division was required.

I attain the above objects by the means illustrated in the accompanying drawings in which Figure 1 is a fragmentary top plan view of a form of the aircraft;

Figure 4 is an enlarged view of the engines, propeller, blower and some associated parts;

Figure 5 is a side elevation of the parts in Figure 4;

Figure 6 is a section through the clutch along the line 6—6 in Figure 4;

Figure 7 is a section through the governor along line 7—7 in Figure 4;

Figure 8 is a section through the governor along line 8—8 in Figure 7;

Figure 9 is an axial section through the pitch changing cylinder in Figure 4;

Figure 10 is an alternate form of the invention showing a view of the engines, propeller, blower and some associated parts.

Figure 11 is fragmentary plan of the preferred form of the invention;

Figure 12 is a fragmentary section along the shaft axis in Figure 11; and

Figure 13 is a fragmentary section in the plane of the paper of Figure 11.

I provide a novel means of connecting the propeller to the engine so that when the engine ceases to function it is disconnected from the propeller. Yet I do not use an over-running clutch for this purpose because the propeller is not then able to act as a flywheel since it cannot exert a forward torque on the engine shaft. Rather I use a clutch operated automatically in accordance with the pressure in one or more engine cylinders. When the gas pressure of the explosion exists the clutch is automatically engaged. This is the preferred clutch form.

In one form of the invention I provide a torque converter or a variable speed transmission with a clutch, preferably an automatic one. With this arrangement not only are the blades adjustable as to pitch but the rate of rotation of the propeller varies relative to the engine shaft. The engine and propeller are then able to produce thrust more efficiently at all speeds of flight and the combination is particularly effective with a wing capable of generating a great lifting capacity.

Figure 1:
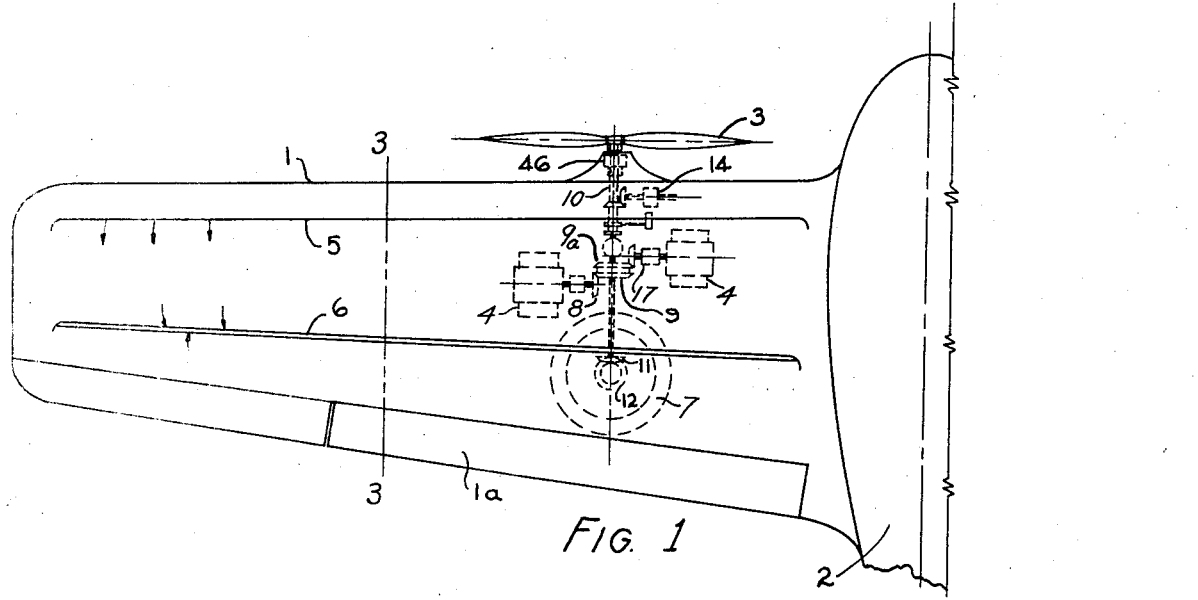
Figure 2:
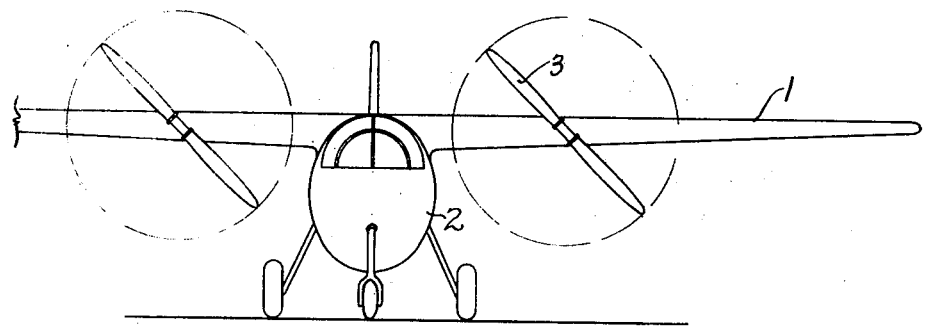
Figure 2 is a fragmentary front view of the aircraft.
Figure 3:
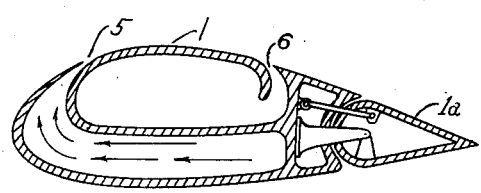
Figure 3 is a chordwise section of the wing along the line 3—3 in Figure 1.

Figure 1 shows the preferred form of the invention in which the wing is 1 and the fuselage is 2. The propeller is 3 driven by the engines 4 through the gears 8 in mesh with bevel gears 9 and 9a fixed to shaft 10. This shaft supplies power to drive the blower 7 by means of shaft 10b, gear train 10a and gears 11 and 12. The blower serves the wing slots 5 and 6 in a manner which has been described in my previous patents such as U. S. Pat. No. 2,041,794, issued May 26, 1936. The blower outer case is 7a.

As shown in Figure 4 each engine drives its gear 8 through an automatic clutch 17 fixed at one side to the engine shaft 15 and on the other side to the gear shaft 16.

Power flows from the engines to the propeller 3 through shaft 10, torque converter 18 and propeller shaft 10.

The torque converter 18 is a device which transmits torque in accordance with the resistance of the driven element. In this case it transmits a torque to the propeller in accordance with the torque requirement of the propeller. Thus the power of the engine is always automatically divided into the proper torque and angular velocity. The torque converter also provides an infinite number of ratios of angular velocities between the engine and propeller.

There are fluid torque converters acting on the general principle of the Föthinger coupling and capable of magnifying the torque but I prefer to use a gyroscopic torque converter such as described in my U. S. Patent No. 2,223,743, issued December 3, 1940, and especially the type described in my application Serial No. 376,489.

The pitch of the propeller is adjustable and governed according to the rate of rotation. Since the engine is not positively connected to the propeller the governor 14 is operated by the propeller shaft 10 rather than the engine shaft. The gear 19 fixed to shaft 10 rotates the fly-weights within the governor. The governor controls the application of fluid pressure to the pitch changing device 20.

The automatic clutch 17 is shown in cross section in Figure 6. The engine drive shaft is 15 and the shaft of gear 8 is 16. The latter has fixed to it the clutch plate 21 with suitable friction material 23 embedded in it. A driving clutch plate 24 is slideably splined to the drive shaft and it can be forced against the driven plate by fluid pressure exerted in the vessel 25 formed of such flexible material as rubber. The extension of the vessel forces the idler plate 26 against plate 24. Between these two plates are balls to eliminate friction tending to rotate parts 26 and 25. The reaction of the fluid pressure is taken by the shell 27 which bears through a ball bearing on the collar 28 integral with the shaft 15. A lug 29 is to be held by a suitable structure to prevent the turning of the shell 27. A spring 22 keeps the clutch plates from rubbing when not engaged.

Pressure is served to the interior of the flexible vessel by the tube 30 from the two-compartment bomb 31. It is divided by the flexible diaphragm 32 and on the clutch side is filled with liquid. On the engine side it is filled with gas from the engine cylinders. It may however be filled with oil particularly if a U-seal is placed in the supply line 33. The remainder of the tube would then be filled by gas from several or all of the engine cylinders.

While the engine is operating the explosive pressure of the gas in any of the cylinders is sufficient to engage the clutch but when the gas in the cylinders fails to explode the clutch disengages the engine from the propeller shaft.

The bombs 31 are interconnected by the manual valve 31a so that when one engine is started pressure is directed to the clutch of the next one so that the active engine may turn the next one over and start it.

The governor 14 is shown in Figures 7 and 8 and is comprised of a shaft 34 driven by the bevel gear 35 in mesh with a gear 19 on shaft 16. Mounted on and turning with the governor shaft are two weights 36 whose arms are hinged at their inner ends to the double lugs 37 fixed to the governor shaft 34. A connecting rod 38 extends from each weight to a valve sleeve 39 freely slideable axially on the governor shaft. These connecting rods are universally connected at their ends to permit the weights to move radially and move the valve sleeve 39 axially. This valve sleeve moves the valve rod 40 in cylinder 40a and is turned to a small diameter at intervals to form free spaces around which fluid can flow.

Fluid is conducted to the valve cylinder through the tube 41 having branches 41a and 41b. A movement of the valve rod permits fluid to enter one of the tubes 42 or 43 leading to the pitch adjusting cylinder 46. In the same instance fluid is permitted to return to the fluid sump 20 through the appropriate tube 44 or 45.

The pump 14a is driven from the propeller shaft 10 and takes its fluid supply from the sump 14b.

The tubes 42 and 43 conduct fluid to the adjusting cylinder 46 which has within the piston 46a. One end of the piston protrudes from the cylinder and has jointed to it the arms 48 which are articulated to levers 49 fixed to the propeller blades. See Figures 4 and 9.

In Figure 4 a movement of the valve rod 40 in the governor sends fluid to one side of the piston moving it and thereby changing the pitch of the propeller blades 50 since they are free to rotate in the hub 51 of the propeller 3. An outward movement of the piston reduces the pitch. A spring 52 within the cylinder turns the blades to a low pitch or the windmill state in case the fluid pressure is absent. Hence the blades assume the position to act as a windmill for increasing the lift, in case of power failure for instance.

The cylinder 46, Figures 4 and 9, is positioned axially on the shaft by a suitable collar 53 and bearings 54 at the rear end of the cylinder. The shaft 10 is free to turn within the piston 46a and both are suitably grooved to provide for sealing. The protruding portion 46b of the piston is splined to shaft 10 and carried by bearing balls on piston 46a.

Returning to Figure 7 there are springs 55 and 55' in the governor bearing on each side of the arms 39a of sleeve 39. At one side the spring 55' bears against the piston 55b sliding in cylinder 55a and pressing against the rubber vessel 56. A tube 55d connects the vessel to the tube 33 so when the engine is running the gas pressure compresses the spring 55 and aids the centrifugal force of the weights 36 in adjusting the pitch to a larger value in case the speed of the engine tends to increase. In Figure 7 the vessel 55a is shown under pressure from the engine.

When the engine stops the pressure in vessel 55a disappears and the valve rod 40 is displaced to the right and so a greater outward travel of the weights 36 must be made before the valve uncovers the tube 41b to send fluid to increase the pitch. Also the centrifugal force of the weights must unaided overcome the action of spring 55 and so the rate of rotation of the propeller is established at a higher level or by suitable adjustment of the parts at any level.

A valve 55e in line 55d is operable manually from the cabin and is usable to adjust the angular velocity and pitch relationship when desired.

The valve rod 40 is borne in the ball bearing housed by the sleeve 39 and is prevented from turning by the lug 39b engaging a projection on the governor housing.

It is now clear that any number of engines can be connected to the propeller drive shaft and the engines can have the advantage of the propeller as a flywheel and yet each engine can be disengaged automatically. Furthermore the speed of rotation of the propeller can be governed independently of any engine's operation.

Figure 4 shows the preferred manner of driving the blower by the propeller acting as a windmill. With the torque converter 18 interposed between the propeller and the blower 7 the latter can have a speed of rotation different from the propeller and yet secure full power from it. That is the torque converter adjusts the blower speed so as to absorb all the power from the propeller while permitting it to operate at its best speed.

Another form of the invention is shown in Figure 10. This differs from the other form in that the torque converter is placed between each engine and its automatic clutch. This arrangement increases the weight somewhat over that of Figure 4.

The preferred form of the invention is shown in Figures 11 to 13.

To obtain the best performance and maximum efficiency from the propeller the pitch of the blades should be adjustable according to the forward speed, and the rate of rotation of the propeller should be adjusted to the pitch. I provide a device sensitive to the forward speed of the aircraft and this governs the pitch setting of the propeller. Then for a given throttle setting the rate of rotation is determined by the torque converter. Hence the speed sensitive device and the torque converter cooperate to give the correct conditions of operation of the propeller.

In Figure 11 the speed sensitive device is the venturi 58 built into the hub of the propeller. The entrance faces into the wind while the exit 59 extends peripherally about the hub. As the forward speed of the aircraft changes the pressure at the Venturi throat changes and this pressure is communicated to the piston 60 in the cylinder 61 via the opening 62 in the Venturi throat and the passage 63 through the propeller shaft. See Figures 12 and 13 particularly. The shaft has the openings 64 in communication with the annular recess 65 in the collar 66. From the recess the pressure is communicated to the piston 60 which controls the valve 40 as previously described in connection with Figure 7.

The pitch changing mechanism shown in Figure 12 is the same as described in connection with Figure 9.

I use the term pressure in the claims to mean any value above the absolute zero of pressure.

While I have illustrated certain special forms of the invention it is to be understood that I do not intend to limit myself to these precise forms but intend to claim it broadly as indicated in the appended claims.

I claim:

1. In an aircraft, a propeller, an engine, a blower, means for connecting said propeller and said blower providing for driving the latter during windmilling of said propeller, a clutch for detachably interconnecting said engine and said propeller providing for transfer of power in either direction therebetween while said clutch is engaged, and means responsive to reduction of the engine power below a predetermined limit for effecting disengagement of said clutch leaving said propeller free to drive said blower by windmilling.

2. In an aircraft, a propeller, means for adjusting the pitch of said propeller, an engine, a blower, means for connecting said propeller and said blower providing for driving of the latter during windmilling of said propeller, a clutch for detachably interconnecting said engine and said propeller providing for transfer of power in either direction therebetween while said clutch is engaged, means responsive to reduction of the engine power below a predetermined limit for effecting disengagement of said clutch leaving said propeller free to drive said blower by windmilling, and means also responsive to said reduction of engine power for controlling said pitch adjusting means to decrease the pitch setting of said propeller.

3. In combination in an aircraft, a propeller shaft, an adjustable pitch propeller mounted on said shaft, a driven load, means connecting said load to said propeller shaft, a prime mover, engageable and disengageable clutch means directly interconnecting said prime mover and said propeller shaft and operable to transmit power substantially without slip in either direction therebetween when engaged, means responsive to the power output of said prime mover for controlling said clutch means to provide for disengagement thereof upon loss of power from said engine to disconnect said propeller from said prime mover, means for adjusting the pitch of said propeller, and means responsive to the speed of rotation of said propeller shaft independently of the speed of said prime mover and operable while said clutch is both engaged and disengaged for controlling the operation of said pitch adjusting mechanism to adjust the pitch of said propeller to provide for control of the speed of said driven load.

4. In combination in an aircraft, a propeller drive shaft, a propeller operably connected to said shaft, a plurality of engines in said aircraft, clutch means associated with each of said engines for separately interconnecting each said engine in direct non-slipping relation with said drive shaft providing for transmission of power for driving said propeller and for driving each said engine when windmilling, means responsive to the development of power by each of said engines for effecting the disengagement of the clutch means associated with each said engine upon failure of that engine to develop power, and manually controlled means for maintaining the clutch means associated with an engine in engaged position in the absence of power operation of said engine to provide for transmission of power thereto.

5. In combination in an aircraft, a propeller drive shaft, an adjustable pitch propeller operably connected to said shaft, means responsive to the speed of said propeller for governing the pitch thereof, a plurality of engines in said aircraft, clutch means associated with each of said engines for separately interconnecting each said engine with said shaft providing for transmission of power in either direction therebetween, means responsive to the development of power by each of said engines for effecting the disengagement of the clutch means associated with each said engine upon failure of that engine to develop power, and manually controlled means for maintaining the clutch means associated with an engine in engaged position in the absence of power operation of said engine to provide for transmission of power thereto.

6. In combination in an aircraft, a propeller, an engine, a torque converter interconnecting said engine and said propeller and providing for transmitting power from one of said elements to the other with a torque varying inversely as the speed of rotation of said propeller, means for adjusting the pitch of the blades of said propeller, means responsive to the speed of rotation of said propeller independently of the speed of said engine, and means interconnecting said speed responsive means and said pitch adjusting means to control the pitch of said blade in accordance with the actual speed of rotation thereof.

7. In combination in an aircraft, a propeller, an engine, a torque converter interposed in the drive between said engine and said propeller for transmitting the power developed by said engine with the maximum available torque at the speed of rotation of said propeller, clutch means for disconnecting said engine and said propeller, means to adjust the pitch of the blade of said propeller, and means responsive to the speed of rotation of said propeller independently of the speed of rotation of said engine for governing said pitch adjusting means.

8. In combination in an aircraft, a propeller, an engine, clutch means for disconnecting said engine and said propeller and operable to transmit power in both directions therebetween, means to adjust the pitch of the blade of said propeller, means responsive to the speed of rotation of said propeller independently of the speed of rotation of said engine for governing said pitch adjusting means, and a torque converter interposed in the drive between said clutch means and said propeller for changing the torque applied to the propeller relative to that developed by the engine and applied to the torque converter inversely in response to a change in the speed of rotation of said propeller.

9. In combination in an aircraft, a propeller, an engine, means responsive to the speed of flight of the aircraft, means controlled by said speed responsive means to adjust the pitch of the blade of said propeller, and a torque converter interconnecting said engine and said propeller and providing for transmitting the power of said engine to said propeller under conditions of torque and speed varying inversely with the speed of rotation and the torque absorbed by the propeller.

10. In combination in an aircraft, a driven shaft and a propeller mounted to be rotated by said shaft, said propeller having a blade adjustable as to pitch, a prime mover having a power shaft, an automatic variable speed transmission connecting said driven shaft and said power shaft and responsive to the difference in torque between said shafts, means for changing the pitch of said blade, means responsive to the speed of said driven shaft to govern said pitch changing means so that the blade pitch is governed as a function of the actual speed of rotation of said propeller independently of the speed of said power shaft, said variable speed transmission increasing the speed of rotation of said driven shaft relative to said power shaft upon reduction of torque therein below that in said power shaft.

11. In combination in an aircraft, a propeller, a driven shaft on which said propeller is mounted, a plurality of prime movers, a torque converter in the drive between said prime movers and said driven shaft and operable to alter the speed of rotation of the propeller automatically in accordance with the difference between the torque applied to said torque converter and the torque reaction of said propeller, and disengageable clutch means between said respective prime movers and said torque converter for separately coupling each of said prime movers to said driven shaft to transmit power from each prime mover through said torque converter to said propeller and in the reverse direction through said torque converter to said driven shaft.

12. In combination in an aircraft, a propeller, a drive shaft on which said propeller is mounted, an engine, an automatic clutch for coupling said engine to said shaft to drive the same, a blower connected to said shaft and adapted to be driven by said engine when coupled to said shaft or by said propeller when windmilling, a torque converter in the drive between said propeller, said engine, and said blower for automatically altering continuously the ratio of the speeds of rotation between said engine and said propeller in response to differences in torque between said propeller and said engine when said engine is operating under power, said torque converter acting automatically to alter continuously the ratio of speeds of rotation between said propeller and said blower in response to the difference of torque between said propeller and blower when said automatic clutch disengages said engine from said propeller and said propeller is windmilling, and means for actuating said clutch to cause disconnection of said engine upon failure of said engine to develop power.

13. In combination in an aircraft, a propeller, a plurality of prime movers, a torque converter, means to transmit power from each prime mover to the torque converter, means to transmit power from the torque converter to said propeller to rotate the latter, said torque converter operating to alter the speed of rotation of the propeller automatically as a function of the difference in torque of said propeller and the sum of the torques of said plurality of prime movers, and means for adjusting the pitch of said propeller in accordance with the actual speed of rotation thereof independently of the speed of said prime movers.

EDWARD A. STALKER.